(12) United States Patent
Kim et al.

(10) Patent No.: US 7,130,845 B2
(45) Date of Patent: Oct. 31, 2006

(54) IMAGE RETRIEVAL METHOD AND APPARATUS INDEPENDENT OF ILLUMINATION CHANGE

(75) Inventors: Sang-kyun Kim, Kyungki-do (KR); Yang-lim Choi, Kyungki-do (KR); Chang-yeong Kim, Kyungki-do (KR); Du-sik Park, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 439 days.

(21) Appl. No.: 10/305,173

(22) Filed: Nov. 27, 2002

(65) Prior Publication Data
US 2003/0126125 A1  Jul. 3, 2003

Related U.S. Application Data

(60) Provisional application No. 60/333,132, filed on Nov. 27, 2001, provisional application No. 60/359,309, filed on Feb. 26, 2002.

(30) Foreign Application Priority Data
Sep. 26, 2002 (KR) ............... 10-2002-0058462

(51) Int. Cl.
*G06F 17/30* (2006.01)
(52) U.S. Cl. ............... 707/3; 707/6; 384/164
(58) Field of Classification Search ............... None
See application file for complete search history.

(56) References Cited

FOREIGN PATENT DOCUMENTS

| | | |
|---|---|---|
| EP | 0 643 358 A2 | 3/1995 |
| EP | 0 643 358 A3 | 3/1995 |
| JP | 10304395 | 11/1998 |
| KR | 1996-0009622 | 3/1996 |
| WO | 00/65535 | 11/2000 |
| WO | 0113263 | 2/2001 |

OTHER PUBLICATIONS

The First Office Action issued by the Chinese Patent Office on Aug. 6, 2004 in corresponding application 0215859.9.

Graham Finlayson et al., "Color Normalization for Color Object Recognition", International Journal of Pattern Recognition and Artificial Intelligence, World Scientific Publishing Company, Singapore, SI, vol. 13, No. 8, Dec. 1999, pp. 1271-1285.

(Continued)

*Primary Examiner*—Jean M. Corrielus
(74) *Attorney, Agent, or Firm*—Buchanan Ingersoll PC

(57) ABSTRACT

An image retrieval method and apparatus independent of an illumination change are provided. The image retrieval method involves: inputting a query image; detecting an illumination color from the query image and converting the illumination color into a standard illumination color; extracting color information of the query image by using color descriptors; and retrieving a similar image by comparing the extracted color information with color information of a database which converts a variety of images into images of standard illumination colors and extracts and stores the color information of the images in advance. According to the method, without changing the structures of color descriptors or a similarity comparison using color information, an image retrieval independent of illumination changes is enabled by adding only a preceding step of standard illumination conversion.

21 Claims, 8 Drawing Sheets
(2 of 8 Drawing Sheet(s) Filed in Color)

OTHER PUBLICATIONS

Graham Finlayson et al., "Comprehenssive Colour Image Normalization", 5th European Conference on Computer Vision, Proceedings Springer—Verlag, Berlin, Germany, vol. 1, 1998, pp. 475-490.

Graham Finlayson et al., "Spectral Sharpening and the Bradford Transform", Proceedings of the Color Imaging Conference; Color Science, Systems, and Applications 2000, pp. 49-55.

Tsin, Y., et al., *Bayesian Color Constancy for Outdoor Object Recognition*, IEEE 2001 Conference on Computer Vision and Pattern Recognition, 2001, pp. 1132-1139.

Finlayson, G., et al., *Color Angular Indexing*, IECCV96, 1996, pp. 16-27.

Rosenberg, C., et al., *Color Constancy Using KL-Divergence*, Proceedings of the Eighth IEEE International Conference on Computer Vision (ICCV '01), vol. 1, Jul. 2001, pp. 239-246.

Funt, B.V., et al., *Color Constant Color Indexing*, IEEE Transactions on Pattern Analysis and Machine Intelligence, vol. 17, No. 5, May 1995, pp. 522-529.

Buluswar, S., et al., *Color recognition in outdoor images*, IEEE International Conference on Computer Vision, Jan. 1998, pp. 171-177.

Forsyth, D.A., *A Novel Algorithm for Color Constancy*, International Journal of Computer Vision, 5:1, 1990, pp. 5-24.

Finlayson, G., et al., *Diagnol Transforms Suffice for Color Constancy*, IEEE International conference on Computer Vision, 1993, pp. 164-171.

Drew, M., et al., *Illumination-Invariant Color Object Recognition via Compressed Chromaticity Histograms of Color-Channel-Normalized Images*, IEEE International Conference on Computer Vision, 1998, pp. 533-540.

Zier, D., et al., *Common Datasets and Queries in MPEG-7 Color Core Experiments*. International Organization for Standardization, ISO/IEC JTC1/SC29/WG11, MPEG99/M5060, 1999, pp. 1-11.

Kim, S., et al., *Color Temperature Descriptor for Display Preference*, International Organization for Standardization, ISO/IEC JTC1/SC29/WG11, M7264, Jul. 2001, pp. 1-6.

Borges, C., *Trichromatic approximation method for surface illumination*, J. Opt. Soc. Am. A, vol. 8, No. 8, Aug. 1991, pp. 1319-1323.

Brainard, D., et al., *Bayesian color constancy*, J. Opt. Soc. Am. A, vol. 14, No. 7, Jul. 1997, pp. 1393-1411.

Copy of Japnese Office Action issued on May 10, 2006, and an English translation thereof.

"5.13.3 Fundamental Concept of Multimedia Content Description in MPEG-7", MPEG-4, pp. 282-291, Sep. 30, 1998 (with English translation).

FIG. 4

```
<!-- ############################################### -->
<!-- Definition of MPEG-7 IIColorType               -->
<!-- ############################################### -->
<complexType name="IIColorType" final="#all">
   <complexContent>
      <extension base="mpeg7:VisualDType">
           <element name="DominantColor" type="mpeg7:DominantColorType"
         minOccurs="0"/>
               <element name="ScalableColor" type="mpeg7:ScalableColorType"
         minOccurs="0"/>
           <element name="ColorLayout" type="mpeg7:ColorLayoutType"
            minOccurs="0"/>
               <element name="ColorStructure" type="mpeg7:ColorStructureType"
         minOccurs="0"/>
           </extension>
   </complexContent>
</complexType>
```

| Binary represlor { | Number of bits | Mnemonic |
|---|---|---|
| DominantColorFlag | 1 | bsbf |
| DominantColor | See subclause 6.4.3 in ISO/IEC 15938-3 | DominantColorType |
| ScalableColorFlag | 1 | bsbf |
| ScalableColor | See subclause 6.5.3 in ISO/IEC 15938-3 | ScalableColorType |
| ColorLayoutFlag | 1 | bsbf |
| ColorLayout | See subclause 6.6.3 in ISO/IEC 15938-3 | ColorLayoutType |
| ColorStructureFlag | 1 | bsbf |
| ColorStructure | See subclause 6.7.3 in ISO/IEC 15938-3 | ColorStructureType |
| } | | |

FIG. 6
FIG. 7
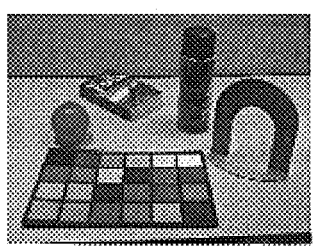
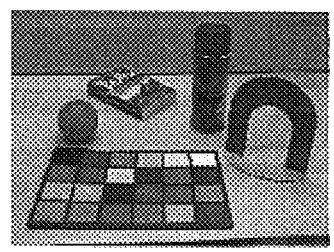
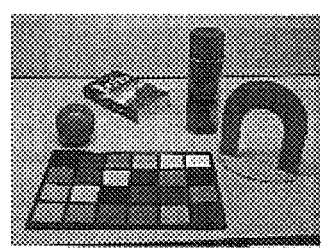

IMAGE RETRIEVAL METHOD AND APPARATUS INDEPENDENT OF ILLUMINATION CHANGE

This application claims the priority of Korean Patent Application No. 2002-58462, filed Sep. 26, 2002, in the Korean Intellectual Property Office. This application also claims the benefit of U.S. Provisional Application No. 60/333,132, filed Nov. 27, 2001 and U.S. Provisional Application No. 60/359,309, filed Feb. 26, 2002. The entire contents of these applications are incorporated herein by reference.

BACKGROUND OF THE INVENTION

1. Field of the Invention

The present invention relates to an image retrieval method, and more particularly, to an image retrieval method and apparatus independent of an illumination change.

2. Description of the Related Art

There are a variety of image retrieval methods. One of them is a text-based image retrieval method in which text is attached to an image and by accessing the text, a desired image is retrieved. When an image is retrieved using text, there are limitations in the text expressions used to describe a picture. Also, semantic interpretations of an image vary for different users who retrieve the image such that cases frequently occur where an image totally different from an image which a user desires to retrieve is retrieved and output.

Another method is a content-based image retrieval method in which the major characteristic features of an image desired to be retrieved are used in retrieving the image. Major characteristic features in an image used in the content-based image retrieval method include a color, texture, shape, motion information, etc. When an image is retrieved using these major characteristic features in the image, the probability that an image desired to be retrieved by a user is found increases. Accordingly, this method can reduce retrieval errors that occur due to the semantic disagreement in text-based image retrieval.

In color-based retrieval, which is a type of content-based retrieval method, a similar image is found by using information on the distribution, kinds, or locations of colors of pixels in an image among a variety of information in the image. A leading retrieval method in color-based retrieval is an image retrieval method using MPEG-7 color descriptors which are the current standards adopted by the ISO/IEC 15938-3. The color descriptors are broadly broken down into four types: a dominant color descriptor, a color structure descriptor, a color layout descriptor, and a scalable color descriptor.

The dominant color descriptor is used when a predetermined color or a small number of colors represent the feature in the entire image or in a part of the image.

The color structure descriptor uses local color structure information together with a histogram. When characteristic information is extracted, color information on each pixel is not extracted independently, but in consideration of color information on neighboring pixels.

The color layout descriptor indicates the spatial distribution of a color. Assuming that a unit obtained by dividing an x-y plane uniformly by a predetermined size is a bin, the spatial distribution of colors existing in an image can be expressed by the number of bins with a 64-bit value. Since similarity calculation can be performed in a very simple way when the color layout descriptor is used, retrieval can be performed quickly. Also, a natural image or a color sketch image can be used as a query. Accordingly, this color layout descriptor can be appropriately applied in video browsing and retrieval.

The scalable color descriptor shows a qualitative expression of a color histogram encoded by a Harr transform, and uses a hue saturation value (HSV) color space. Since the similarity between two images is determined by the hamming distance between scalable color descriptors, similarity calculation can be performed quickly.

However, the image retrieval method using color information expressed by using the MPEG-7 color descriptors described above is sensitive to illumination. Consequently, images having identical contents may have different color information due to small differences of surrounding illuminations when the images are photographed such that image retrieval is not accurately performed. For example, a natural image may not be accurately retrieved due to a color information change caused by time and weather changes (for example, brightness and shadows in an image), a color information change caused by different illuminations (for example, an incandescent lamp or a fluorescent lamp), or a color information change occurring when an identical image is captured by different image capture apparatuses (for example, cameras produced by different manufacturers).

SUMMARY OF THE INVENTION

Accordingly, the invention provides an image retrieval method and apparatus independent of illumination changes, in which in order to retrieve an image independently of illumination changes, a query image and images stored in an image database are converted into images of illumination colors under a standard illumination and color information of the converted images is compared to each other.

In one aspect, the invention provides an image retrieval method independent of illumination changes, comprising: inputting a query image; detecting an illumination color from the query image and converting the illumination color into a standard illumination color; extracting color information of the query image by using color descriptors; and retrieving a similar image by comparing the extracted color information with color information of a database which converts a variety of images into images of standard illumination colors and extracts and stores the color information of the images in advance.

In another aspect, the invention provides an image retrieval apparatus independent of illumination changes, comprising: a query image input unit which receives a query image; a standard illumination color converting unit which detects an illumination color from the query image and converts the illumination color into a standard illumination color; a query image color information extracting unit which extracts color information of the converted query image by using color descriptors; a database which converts a variety of images desired to be retrieved into images of standard illumination colors and extracts and stores the color information of the images in advance; and a similar image retrieval unit which finds a similar image by comparing the color information of the query image that is converted into an image of the standard illumination color, with color information on the variety of images stored in the database.

In another aspect, the invention provides a standard illumination color converting method, comprising: removing low luminance parts and self luminance parts from an input query image; detecting an illumination color of the image from the remaining pixels after the removal of the low luminance parts and self luminance parts; and converting the detected illumination color into a standard illumination color. Preferably, the detecting step, comprising: converting a tri-stimulus value XYZ of each pixel of the query image from which low luminance parts and self luminance parts have been removed, into chromaticity coordinates (x, y); projecting the converted chromaticity coordinates on an x-y plane; dividing the x-y plane uniformly into a grid of a predetermined size; counting the number of projected pixels existing in each divided grid; removing pixels in a grid if the counting result indicates that the counted value of the grid is less than a predetermined value; and calculating an average value of central coordinates of the remaining grids after the removal, and determining the average as a standard illumination color of the input image.

In another aspect, the invention provides computer readable media having embodied thereon computer programs for performing the above-described image retrieval method and the standard illumination color converting method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above objects and advantages of the present invention will become more apparent by describing in detail preferred embodiments thereof with reference to the attached drawings in which:

FIG. 4 is a diagram of an embodiment of an expression form of a color descriptor for describing an image;

FIG. 6 shows examples of outdoor natural images used in an experiment;

FIG. 7 shows examples of set images of objects photographed indoors used in an experiment;

DESCRIPTION OF THE PREFERRED EMBODIMENTS

Figure 1:
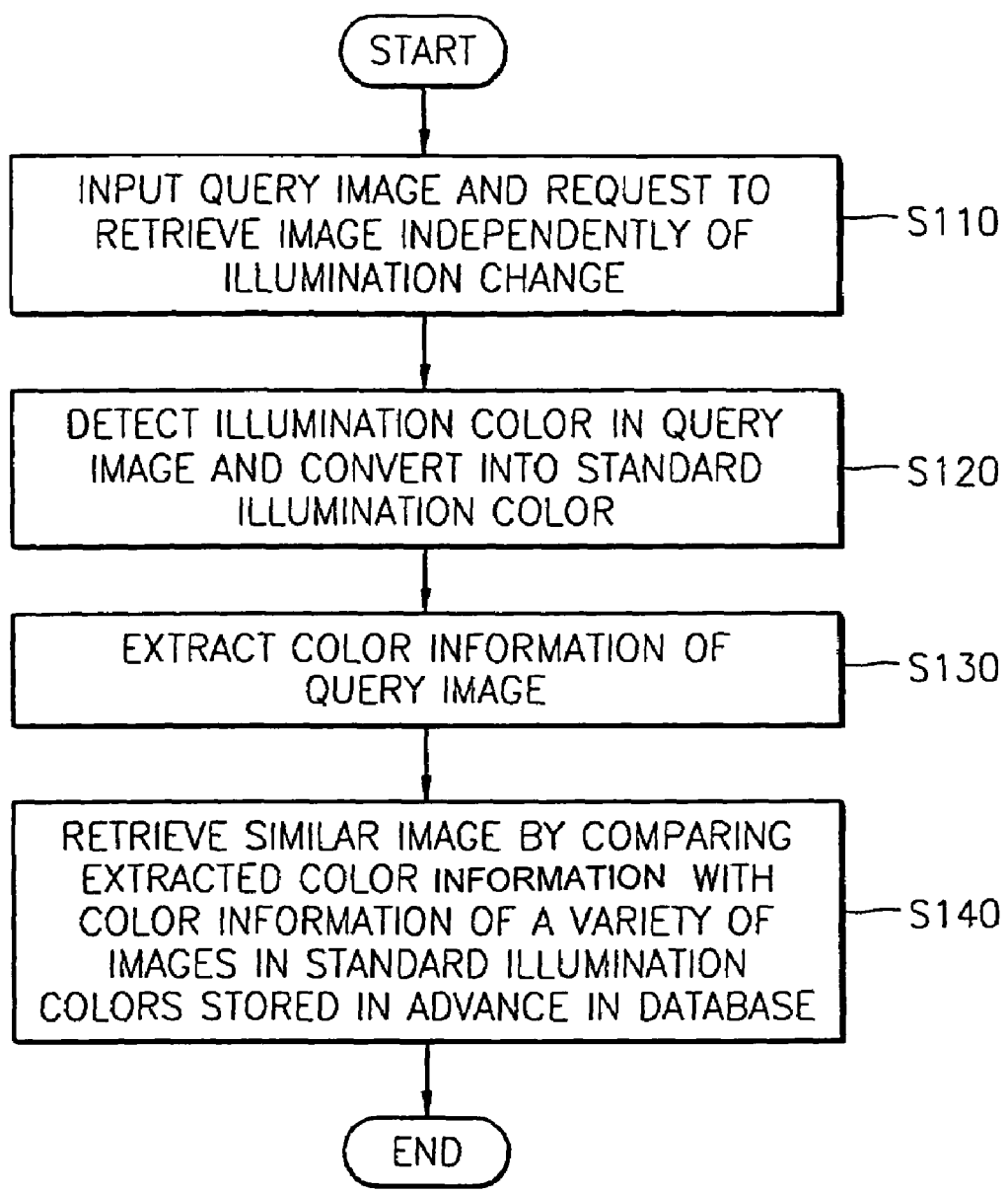
FIG. 1 is a flowchart of an image retrieval process of the present invention.

Referring to a flowchart of an image retrieval process of the present invention in FIG. 1, first, a query image and a request to retrieve an image independently of illumination changes are input by a user in step S110. An illumination color is detected in the query image and the color is converted into a standard illumination color in step S120. Color information of the query image is extracted by using a color descriptor in step S130. By comparing the extracted color information with color information in a database which converts a variety of images into images of standard illumination colors and extracts and stores the color information of the images in advance, a similar image is searched for in step S140.

Figure 2:
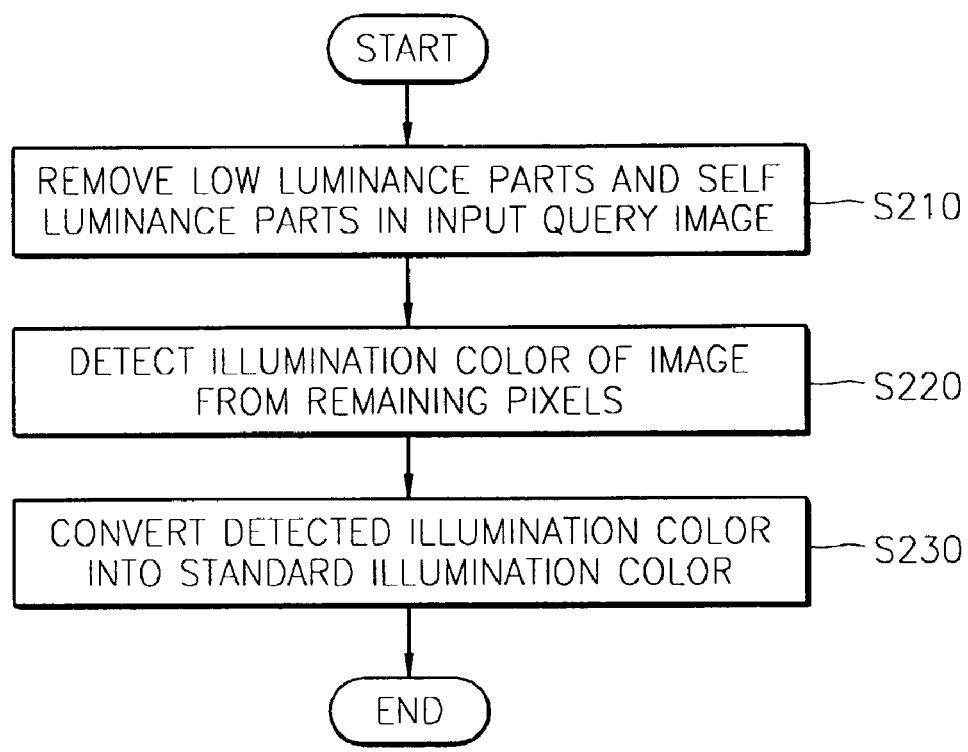
FIG. 2 is a flowchart of a step for detecting an illumination color in a query image and converting the color into a standard illumination color.

Referring to FIG. 2, the step S120 for detecting an illumination color in a query image and converting the detected color into a standard illumination color will now be explained in detail. FIG. 2 is a flowchart of the step S120 for detecting an illumination color in a query image and converting the color into a standard illumination color.

First, in the input query image, low luminance parts and self luminance parts are removed in step S210. From the remaining pixels, the illumination color of the image is detected in step S220 and the detected illumination color is converted into a standard illumination color in step S230.

Step S210 for removing low luminance parts and self luminance parts in the input query image is performed as follows. First, red, green, and blue (RGB) values of pixels of the input query image are converted into a Commission Internationale de L'clairage (CIE) tri-stimulus value XYZ.

Then, by using the converted tri-stimulus value XYZ, pixels having low luminance values are removed. There are a number of methods for determining whether or not a pixel has a low luminance value. For example, if a Y value of a pixel is included in the lowest 5% of the Y values of all of the pixels, it may be determined that the pixel has a low luminance value.

Next, by obtaining a self luminous threshold, self luminance pixels in the image are removed. The self luminance pixel refers to a pixel of an image of a luminescent object, such as the sun or electric lights. The self luminous threshold can also be obtained by using prior art methods, and pixels having values greater than the threshold are determined as self luminance pixels and removed.

The step S220 for detecting the illumination color of the input image from the remaining pixels is performed as follows. First, the tri-stimulus value XYZ of each pixel in the query image in which the low luminance parts and self luminance parts are removed is converted into chromaticity coordinates (x, y). For example, the x value of chromaticity coordinates may be calculated by a formula such as $X/(X+Y+Z)$, while the y value of chromaticity coordinates may be calculated by a formula such as $Y/(X+Y+Z)$.

FIGS. 3A through 3D are diagrams for explaining a process for converting a color into a standard illumination color. Referring to FIGS. 3a through 3d, the converting process will now be explained in detail.

Figure 3A:
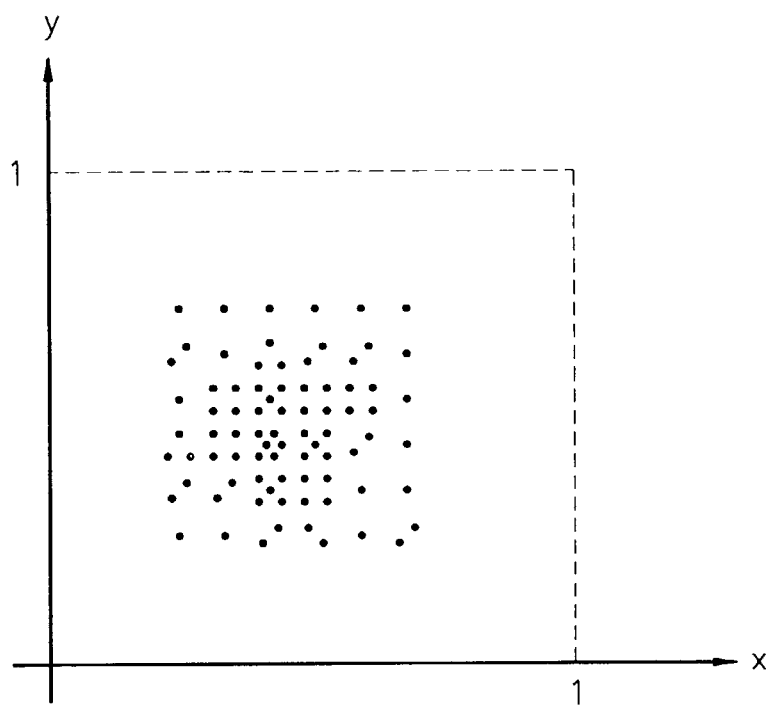
FIGS. 3A through 3D are diagrams for explaining a process for converting a color into a standard illumination color.
Figure 3B:
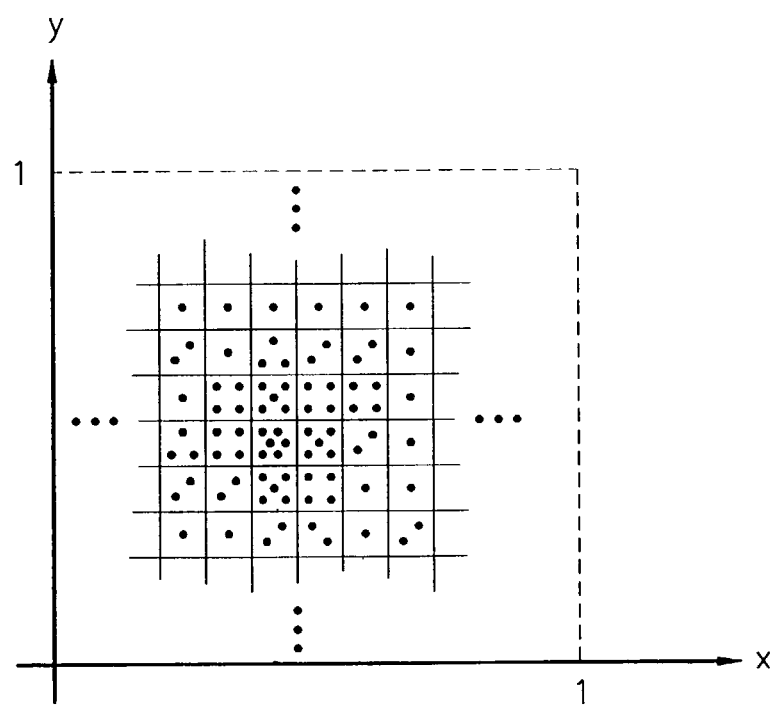

First, the converted (x, y) values are projected on an x-y plane. Then, the figure as shown in FIG. 3A is obtained. The thus-obtained x-y plane is divided uniformly into bins of a predetermined size as shown in FIG. 3B. For example, the x-y plane may be divided into a 60×60 grid plane. Then, the number of pixels in each bin is counted and stored. If the number is less than an arbitrary threshold, the bin is removed.

Figure 3C:
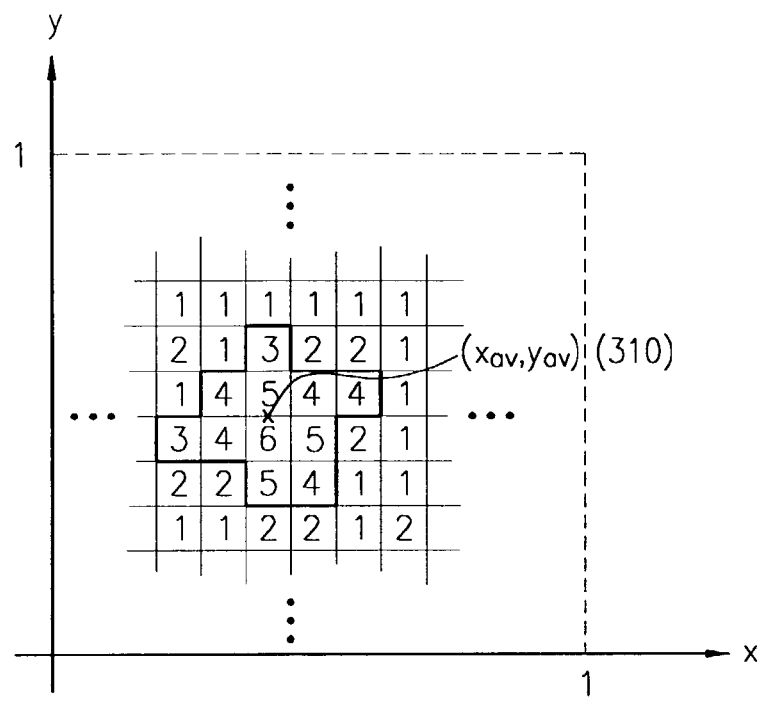
Figure 3D:
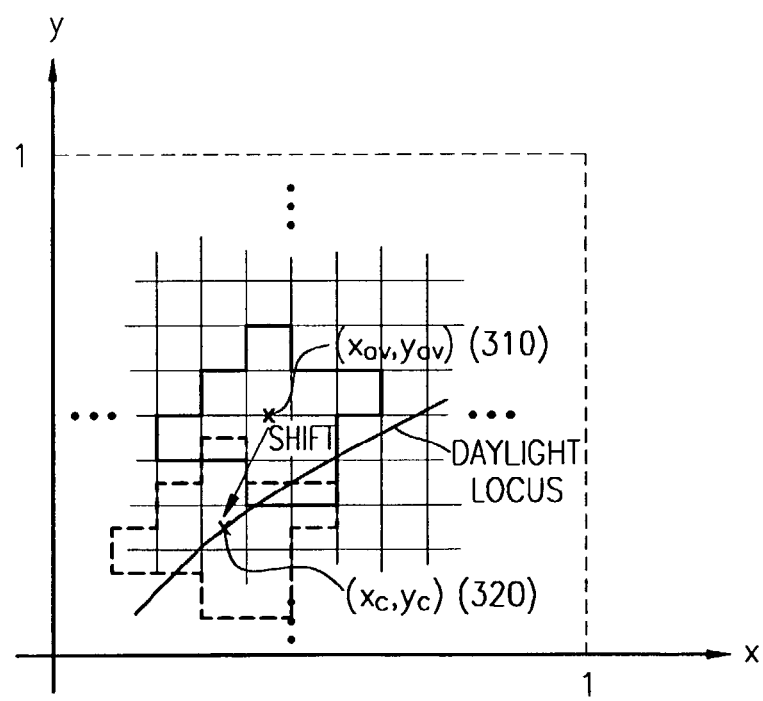

Then, the result in FIG. 3C is obtained. Next, by dividing the sum of central coordinate values of the remaining bins by the number of remaining bins, an average chromaticity ($x_{av}$, $y_{av}$) 310 is obtained and is determined as the illumination color of the input image. In particular, $x_{av}$ is obtained by dividing the sum of the x central coordinate values of the remaining bins by the number of remaining bins, and $y_{av}$ is obtained by dividing the sum of the y central coordinate values of the remaining bits by the number of remaining bins.

Finally, the step S230 for converting the detected illumination color into a standard illumination color will now be explained. First, standard illumination chromaticity coordinates ($x_c$, $y_c$) 320 on the daylight locus corresponding to a standard color temperature 6500K is found. Then, by using the average chromaticity ($x_{av}$, $y_{av}$) 310, the standard illumination chromaticity coordinates ($x_c$, $y_c$) 320, and a Bradford color adaptation transform matrix, the tri-stimulus value XYZ of each pixel of the input image is converted into a tri-stimulus value X'Y'Z' of the standard illumination. Finally, the thus-converted standard illumination tri-stimulus value X'Y'Z' is converted into an RGB value.

In step S130 for extracting color information of the query image by using a predetermined color descriptor, the variety of color descriptors described above are used. That is, an image is described by using the MPEG-7 standard color descriptors for expressing the colors of an image in the query image and database images.

FIG. 4 is a diagram of an embodiment of an expression form of a color descriptor for describing an image. This embodiment contains information on the four color descriptors.

In the final step S140 for searching for a similar image by comparing the extracted color information with color information in a database which converts a variety of images into images of standard illumination colors and extracts and stores the color information of the images in advance, the retrieval results are output in order of increasing distance, by calculating distances between extracted color descriptors.

Figure 5A:
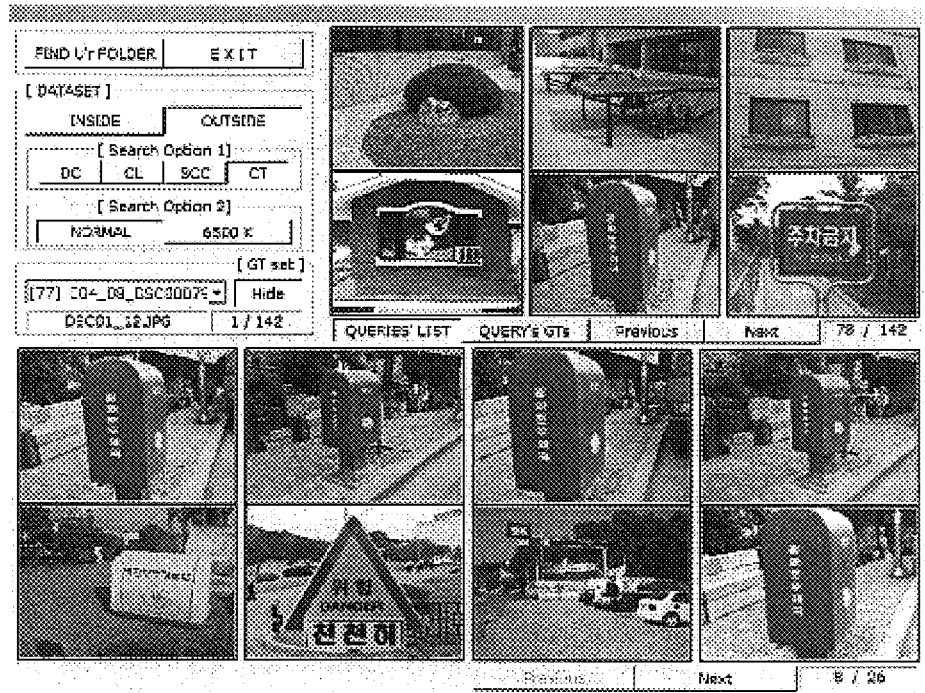
FIGS. 5A and 5B show retrieval results before and after using an image retrieval method of the present invention.
Figure 5B:
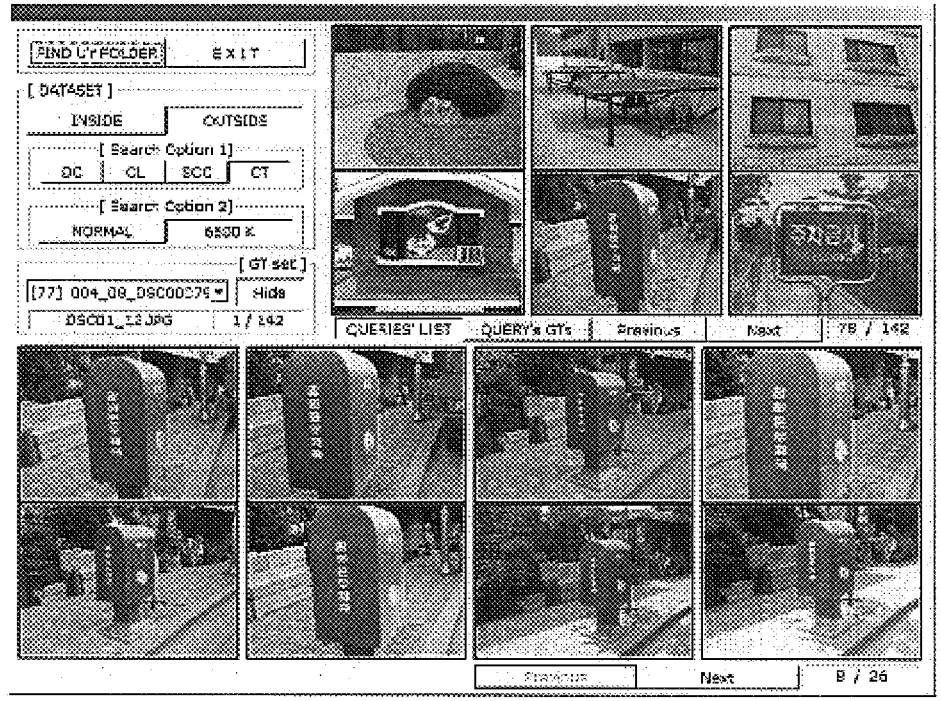

FIGS. 5A and 5B show retrieval results before and after using an image retrieval method of the present invention.

When a prior art image retrieval method was used and a command for retrieving images very similar to a postbox image was given, images totally different from the postbox image were output. However, when the image retrieval method of the present invention was used, accurate results were obtained as shown in FIG. 5*b*.

Tables 1a through 1d show gain changes when the image retrieval method of the present invention was used.

TABLE 1a

|  | Not converted into standard illumination color | Converted into standard illumination color | Gain changes (ANMRR) |
|---|---|---|---|
| Using parameters | 0.183983 | 0.298456 | +0.114473 |
| Not using parameters | 0.325878 | 0.409459 | +0.083581 |

TABLE 1b

|  | Not converted into standard illumination color | Converted into standard illumination color | Gain changes (ANMRR) |
|---|---|---|---|
| Using parameters | 0.429638 | 0.306655 | −0.122983 |
| Not using parameters | 0.469480 | 0.340987 | −0.128493 |

TABLE 1c

|  | Not converted into standard illumination color | Converted into standard illumination color | Gain changes (ANMRR) |
|---|---|---|---|
| Using parameters | 0.710394 | 0.355556 | −0.354838 |
| Not using parameters | 0.739785 | 0.389964 | −0.349821 |

TABLE 1d

|  | Not converted into standard illumination color | Converted into standard illumination color | Gain changes (ANMRR) |
|---|---|---|---|
| Using parameters | 0.488618 | 0.409816 | −0.078802 |
| Not using parameters | 0.566681 | 0.464205 | −0.102476 |

Table 1a is the result when a CCD data set defined in the MPEG-7 standard was used, and shows that when the retrieval method independent of illumination according to the present invention was used, gain increased by 0.11 when parameters were used and by 0.08 when parameters were not used. This result was expected because images having identical contents with different illuminations are rarely included in the CCD data set itself.

Table 1b is the result when natural outdoor images as shown in FIG. 6 were used. Table 1c is the result when set images of objects photographed indoors as shown in FIG. 7 were used. Table 1d is the result when the MPEG-7 CCD data set and outdoor natural images were used together. Referring to tables 1b through 1d, it is shown that the retrieval method of the present invention is superior.

Figure 8:
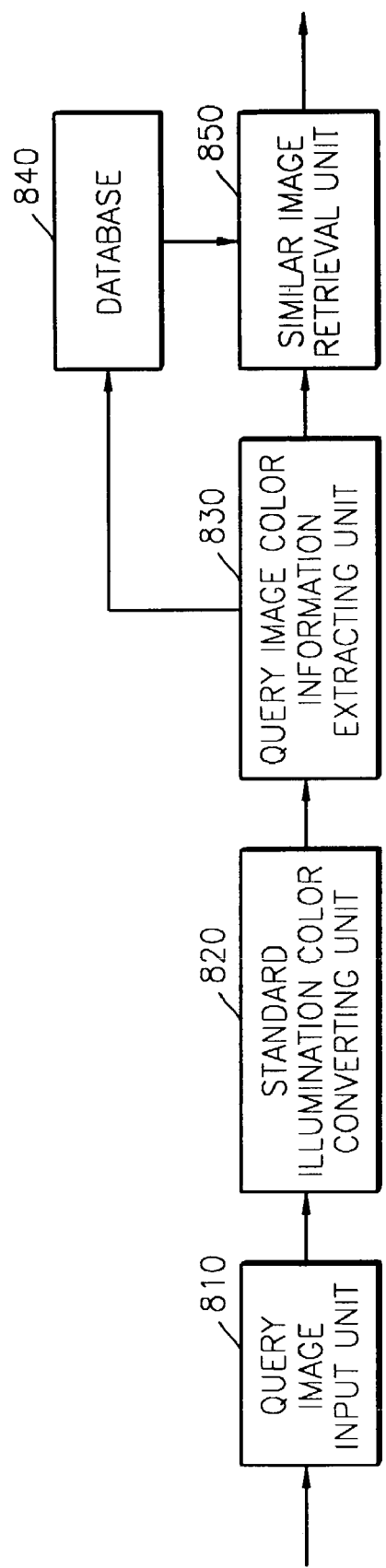
FIG. 8 is a block diagram of an image retrieval apparatus performing the image retrieval method described above.

FIG. 8 is a block diagram of an image retrieval apparatus performing the image retrieval method described above.

The image retrieval apparatus comprises a query image input unit 810, a standard illumination color converting unit 820, a query image color information extracting unit 830, a database 840, and a similar image retrieval unit 850.

The query image input unit 810 receives a request to retrieve an image independent of illumination changes and a query image from a user.

The standard illumination color converting unit 820 detects an illumination color in the query image and converts the color into a standard illumination color. For this, low luminance parts and self luminance parts are removed, the illumination color of the image is detected from the remaining pixels, and the detected illumination color is converted into a standard illumination color. These processes have been described in more detail above.

The query image color information extracting unit 830 extracts color information of the query image by using predetermined color descriptors. That is, an image is described by using the MPEG-7 standard color descriptors which express colors of the query image and database images.

The database 840 converts a variety of images desired to be retrieved into standard illumination colors in advance and extracts and stores the color information of the images.

The similar image retrieval unit 850 finds a similar image by comparing the color information of the query image that is converted into a standard illumination color with color information of a variety of images stored in the database.

Figure 9:
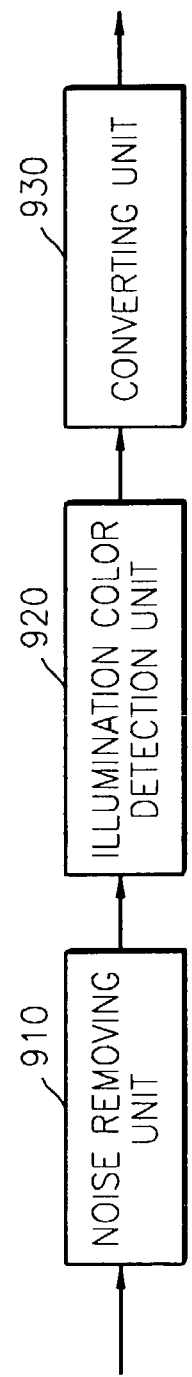
FIG. 9 is a detailed block diagram of a standard illumination color converting unit.

FIG. 9 is a detailed block diagram of the standard illumination color converting unit 820.

A noise removing unit 910 removes low luminance parts and self luminance parts in the input query image. An illumination color detection unit 920 detects the illumination color of the image from the remaining pixels after the noise removing unit 910 removes noise. A converting unit 930 converts the detected illumination color into a standard illumination color.

The present invention may be embodied in a code, which can be read by a computer, on a computer readable recording medium. The computer readable recording medium can be any kind of recording apparatuses on which computer readable data are stored.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

Although the present invention has been described with reference to the embodiment above, the present invention is not limited to the embodiment described above, and it is apparent that variations and modifications by those skilled in the art can be effected within the spirit and scope of the present invention defined by the appended claims. Therefore, the scope of the present invention is not determined by the above description but by the accompanying claims.

As described above, without changing the structures of color descriptors or the similarity comparison method in the prior art retrieval method using color information, the present invention enables image retrieval independent of illumination changes by adding only a preceding step of standard illumination conversion. That is, a method by which identical images photographed under different illuminations can be retrieved when an image is retrieved by using color information is provided. According to this method, identical images which the user photographed at different time points, under different weather conditions, different illuminations or with different photographing apparatus can be effectively retrieved.

What is claimed is:

1. An image retrieval method independent of illumination changes comprising:
    inputting a query image;
    detecting an illumination color from the query image and converting the illumination color into a standard illumination color;
    extracting color information of the query image by using color descriptors; and
    retrieving a similar image by comparing the extracted color information with color information of a database which converts a variety of images into images of standard illumination colors and extracts and stores the color information of the images in advance.

2. The method of claim 1, wherein the converting step comprises:
    removing low luminance parts and self luminance parts from the input query image;
    detecting an illumination color of the query image from the remaining pixels after the removal of the low luminance parts and self luminance parts; and
    converting the detected illumination color into a standard illumination color.

3. The method of claim 2, wherein the removing step comprises:
    converting a red, green, and blue (RGB) value of each pixel in the input query image into a tri-stimulus value XYZ;
    removing pixels having low luminance values from the pixels in the image, by using the converted tri-stimulus value XYZ; and
    removing self luminance pixels from the pixels in the image, by using the converted tri-stimulus value XYZ.

4. The method of claim 3, wherein if the Y value of the tri-stimulus value of a pixel is included in the lowest 5% of the Y values of all of the pixels, it is determined that the pixel has a low luminance value.

5. The method of claim 3, wherein it is determined that pixels having values greater than a predetermined self luminance threshold are self luminance pixels, and then the self luminance pixels are removed.

6. The method of claim 2, wherein the detecting step comprises:
    converting a tri-stimulus value XYZ of each pixel of the query image from which low luminance parts and self luminance parts have been removed, into chromaticity coordinates (x, y);
    projecting the converted chromaticity coordinates on an x-y plane;
    dividing the x-y plane uniformly into a grid of a predetermined size;
    counting the number of projected pixels existing in each divided grid;
    removing pixels in a grid if the counting result indicates that the counted value of the grid is less than a predetermined value; and
    calculating an average value of central coordinate values of the remaining grids after the removal, and determining the average as a standard illumination color of the input image.

7. The method of claim 6, wherein the x value of the chromaticity coordinates is calculated by a formula $X/(X+Y+Z)$ and the y value of the chromaticity coordinates is calculated by a formula $Y/(X+Y+Z)$.

8. The method of claim 6, wherein the x-y plane is divided into a 60×60 grid.

9. The method of claim 2, wherein the step for converting the detected illumination color into a standard illumination color comprises:
    finding standard illumination chromaticity coordinate values on a daylight locus corresponding to a standard color temperature;
    converting the tri-stimulus value XYZ of each pixel of the illumination color detected in the detection step, into a standard illumination tri-stimulus value $X=Y=Z=$, by using the standard illumination chromaticity coordinate values and a Bradford color adaptation transform matrix; and
    converting the converted standard illumination tri-stimulus value $X=Y=Z=$ into an RGB value.

10. The method of claim 9, wherein the standard color temperature is 6500K.

11. The method of claim 1, wherein in the extracting step, color information of the query image is extracted by using a dominant color descriptor when a predetermined color or a small number of colors in an image represent the entire image or a part of the image.

12. The method of claim 1, wherein in the extracting step, color information of the query image is extracted by using a color structure descriptor which uses local color structure information together with a histogram, and when characteristic information is extracted, extracts color information on each pixel not independently, but in consideration of color information on neighboring pixels.

13. The method of claim 1, wherein in the extracting step, color information of the query image is extracted by using a color layout descriptor which indicates the spatial distribution of a color.

14. The method of claim 1, wherein in the extracting step, color information of the query image is extracted by using a scalable color descriptor which shows a color histogram encoded by a Harr transform and uses a hue saturation value (HSV) color space.

15. The method of claim 1, wherein in the retrieval step, retrieval results are output in order of increasing hamming distance by using the results of calculating hamming distances between the extracted color descriptors.

16. An image retrieval apparatus independent of illumination changes comprising:
a query image input unit which receives a query image;
a standard illumination color converting unit which detects an illumination color from the query image and converts the illumination color into a standard illumination color;
a query image color information extracting unit which extracts color information of the converted query image by using color descriptors;
a database which converts a variety of images desired to be retrieved into images of standard illumination colors and extracts and stores the color information of the images in advance; and
a similar image retrieval unit which finds a similar image by comparing the color information of the query image that is converted into an image of the standard illumination color, with color information on the variety of images stored in the database.

17. The apparatus of claim 16, wherein the standard illumination color converting unit comprises:
a noise removing unit which removes low luminance parts and self luminance parts from the input query image;
an illumination color detection unit which detects an illumination color of the image from the remaining pixels after the noise removing unit has removed noise; and
a converting unit which converts the detected illumination color into a standard illumination color.

18. The apparatus of claim 17, wherein the noise removing unit converts a red, green, and blue (RGB) value of each pixel in the input query image into a tri-stimulus value XYZ, and removes pixels having low luminance values and self luminance pixels from the pixels in the image, by using the converted tri-stimulus value XYZ.

19. The apparatus of claim 17, wherein the illumination color detection unit converts a tri-stimulus value XYZ of each pixel of the query image from which low luminance parts and self luminance parts have been removed, into chromaticity coordinates (x, y); projects the converted chromaticity coordinates on an x-y plane; divides the x-y plane uniformly into a grid of a predetermined size; counts the number of projected pixels existing in each divided grid; removes pixels in a grid if the counting result indicates that the counted value of the grid is less than a predetermined value; and calculates an average of central points of the remaining grids after the removal, and determining the average as a standard illumination color of the input image.

20. The apparatus of claim 17, wherein the converting unit finds standard illumination chromaticity coordinate values on a daylight locus corresponding to a standard color temperature; converts the tri-stimulus value XYZ of each pixel of the illumination color detected in the detection step into a standard illumination tri-stimulus value X=Y=Z= by using the standard illumination chromaticity coordinate values and a Bradford color adaptation transform matrix; and then converts the converted standard illumination tri-stimulus value X=Y=Z= into an RGB value.

21. A computer readable medium having embodied therein a computer program for performing the method of claim 1.

* * * * *